United States Patent

Dahl et al.

[11] Patent Number: 6,051,821
[45] Date of Patent: Apr. 18, 2000

[54] COOKING SURFACE WITH OPTIMIZED DISTANCE BETWEEN INDUCTION COIL AND COOKING VESSEL

[75] Inventors: Jan E. Dahl; Thomas F. Pedersen, both of Fredericia, Denmark

[73] Assignee: Aktiebolaget Electrolux, Stockholm, Sweden

[21] Appl. No.: 08/930,923

[22] PCT Filed: Apr. 9, 1996

[86] PCT No.: PCT/DK96/00169

§ 371 Date: Nov. 24, 1997

§ 102(e) Date: Nov. 24, 1997

[87] PCT Pub. No.: WO96/31995

PCT Pub. Date: Oct. 10, 1996

[30] Foreign Application Priority Data

Apr. 7, 1995 [DK] Denmark .................................. 0424/95

[51] Int. Cl.$^7$ ............................................. H05B 6/12
[52] U.S. Cl. ........................................... 219/622; 219/446
[58] Field of Search ...................... 219/621–623

[56] References Cited

U.S. PATENT DOCUMENTS

| | | | |
|---|---|---|---|
| 3,949,183 | 4/1976 | Usami et al. | 219/622 |
| 4,833,288 | 5/1989 | Poumey et al. | 219/622 |

*Primary Examiner*—Teresa Walberg
*Assistant Examiner*—Jeffrey Pwu
*Attorney, Agent, or Firm*—Pearne, Gordon, McCoy & Granger LLP

[57] ABSTRACT

A cooking surface has a thickness between 0.05 and 3.0 mm to optimize between highest efficiency, lowest magnetic stray field, and desired surface material. In the thickness range of 0.05 to 0.2 mm, a top layer may consist of plasma sprayed hard ceramic such as alumina which can be impregnated with poly-tetra-fluor-ethylene. In the thickness range of 0.2 to 2.0 mm, the top layer may consist of glass fibre reinforced material which can be impregnated with poly-tetra-fluor-ethylene and can be of a hardened quality. In the thickness range of 1.00 to 3.00 mm, the top layer may consist of a vitroceramic or glass material.

16 Claims, 3 Drawing Sheets

Impregnated plasma spraying

50 – 200 μm

Glass fibre reinforced material 0.2 – 2 mm

Glass / Glass-ceramic

1 – 3 mm

COOKING SURFACE WITH OPTIMIZED DISTANCE BETWEEN INDUCTION COIL AND COOKING VESSEL

BACKGROUND OF THE INVENTION

The invention relates to a cooking surface for an induction heating cooker comprising a coil structure below the surface.

Flat and heat tolerant upper surfaces for cookers are well known, and their use in domestic kitchens is predominantly due to the ease with which one may move cooking utensils from one to the other cooking zone, the ease of cleaning, and the quick thermal response. However, most of these are made selfsupporting of a glass or vitroceramic material which have to be quite thick in order to withstand the dropping of cooking utensils. The differences in coefficient of expansion between the top plate of said glass or vitroceramic material and the supporting metal frame make the manufacture complex and the cleaning of the edges of the top plate is rather more difficult due to the need to allow expansion with respect to the surrounding frame.

The fairly thick glass or vitroceramic top plates which have become known in connection with radiative heating zones have been carried over into the area of induction heating, mainly because of the well-established manner of manufacture, provision with patterns and signs and because the material combines electrical insulation with strength. The hampering in energy transfer due to the spacing between the transmitting coil and the cooking utensil has been accepted in view of the other advantages.

In WO94/05137 a cooking plate concept is described which utilises an induction heating arrangement comprising a ring-shaped magnetic core structure made of magnetically conductive concrete. This structure is embedded in further concrete material, and the top surface may be either cast upon the fairly solid base or be made of possibly porous alumina (aluminium oxide ceramic) which demonstrates a high thermal insulation and abrasion resistance. This latter material would be applied by plasma spraying. It is hence non-selfsupporting. However, this kind of top surface material, although thermally excellent, has shown certain disadvantages in practice. The inherent porosity makes the surface difficult to clean, although very strong detergents may be used, due to the chemical stability of alumina. The casting in place of a top layer of heat resistant concrete is efficient in the manufacturing process, but the finishing of such a surface and the sealing of the pores to permit cleaning are difficult tasks and the result may be destroyed by detergents. Hitherto it has been considered that a top layer should be as thin as possible for efficient power transport, in other words, the air gap should be minimized. Hence all endeavours in this field have worked towards this goal. The structure described above provides this possibility in a most efficient manner, but at the cost of a very massive construction.

BRIEF SUMMARY OF THE INVENTION

There is hence a need for an improved surface which does not display the above-identified disadvantages, yet still provide the functionality of a construction of the type described in said PCT publication.

This is obtained by applying the realization that the heating of the top surface is due to two contributions: losses in the induction energy transmitter which is embedded in the base at some distance from the upper surface of the heat insulating layer and conduction of heat from the heated cooking vessel via the heat insulating layer to the induction energy transmitter. Said heating actually increases the losses of the induction energy transmitter. In fact, it has surprisingly turned out that for each combination of permeability in the bottom of the cooking vessel and the range of power handled by the cooking zone there is a range of thicknesses of the top layer which provides an optimum of efficiency in the transfer of power from the cooking zone to the cooking utensil. It has turned out that such thicknesses all fall in the same absolute range which is in all cases below the 3 mm which is in general industrial use today. The improved structure is characteristic in that the thickness of the cooking surface is chosen between 0.05 mm and 3 mm, preferably between 0.2 and 2.5 mm. The preferential distance also affords a good performance as regards magnetic field leakage. The specific thickness to be used in any particular combination of coil structures, operational frequency and cooking vessel range may be determined by the skilled person without undue experimentation.

In an embodiment of the invention the surface is particular in that it extends unbroken over the totality of the coil structures at least to the edge area of the cooking area. This will give certain advantages as concerns cleaning by washing and may be supplemented by raised edges formed in the same material.

A further embodiment extends directly from the basic idea of the invention in that the top layer has a limited area, though larger than a coil structure, and may be removeable but flush with the surrounding surface when fitted. This makes it possible to fit surfaces above the coil structure which may be changed when eroded, permanently soiled, or perhaps not fitting with the internal decoration of the kitchen area, all in all making this highly technological product much more adaptable to living conditions than previously known cookers.

Further embodiments of the invention adapts the material of the top surface to the thickness determined for the particular construction, viz. for the thickness range 0.05 to 0.2 mm the top layer consists of plasma sprayed hard ceramic such as alumina, possibly impregnated with poly-tetra-fluor-ethylene, and for the thickness range 0.2 to 2 mm the top layer consists of a glass fibre reinforced material, possibly impregnated with poly-tetra-fluor-ethylene, possibly of a hardened quality. For the thickness range 1.00 to 3.00 mm the top layer consists of a vitroceramic or glass material. These materials each combine good wearing qualities with good cleaning properties, however according to the invention they are so thin that they would not be able to support themselves over large areas, let alone carry cooking vessels.

A further material which may advantageously be used in embodiments of the invention is an organically modified ceramic material.

In order to permit the user to determine which coil structure (which cooking zone) has most recently been active, a further advantageous embodiment incorporates reversible heat-modifiable pigments into the surface. This is now feasible and with a wide range of fairly low-temperature pigments because the invention provides for a high efficiency and hence low losses and reduced heating of the surface itself.

The specified thickness and the consequent reduction of heating losses according to the invention makes it possible to construct an induction heating cooker with several cooking zones which is totally self-supporting, i.e. without brackets between the edge frame members and yet lightweight. This is obtained by a construction which is particular in that one or several transmitter coil structure or structures is/are embedded in a polymer structure which is composed with a compartmentalised underside and a plane topside incorporating shallow wells for exchangeable top layers above each transmitter coil. A similar embodiment uses a light alloy in stead of a polymer, with the specific advantage that stray fields from the coil structures are shielded or short-circuited.

It has furthermore been realized that it is possible to obtain a thickness in the upper part of the range and yet retain the materials for the lower part of the thickness range with the advantages particular to those materials in that the surface consists of a protective layer and a number of projections directed upwards from said layer, the height of the projections defining the thickness of the cooking surface. There is no limitation to the area and number of these projections, however in case only very few are used, they must not be so sharp as to scratch the cooking utensils. Obviously a minimum number of three supporting projections are needed for a pot. The particular advantage of this embodiment must be seen in the layer of air which creates heat insulation between the bottom of the cooking vessel and the coil structure embedded in the cooker.

BRIEF DESCRIPTION OF THE SEVERAL VIEWS OF THE DRAWING

The invention will be described in greater detail in the following with reference to the drawings, in which.

DETAILED DESCRIPTION OF THE INVENTION

Figure 1:
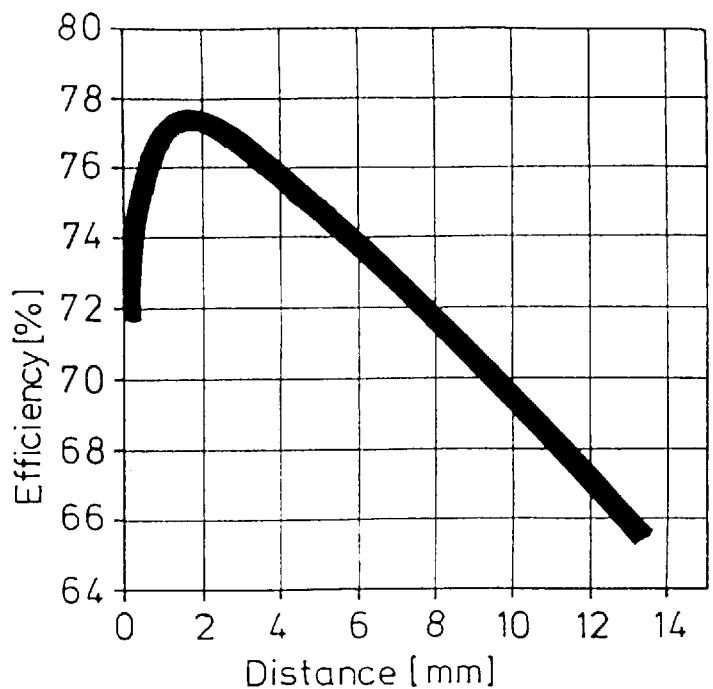
FIG. 1 shows the general relationship between efficiency-and thickness of the top layer.
Figure 2:
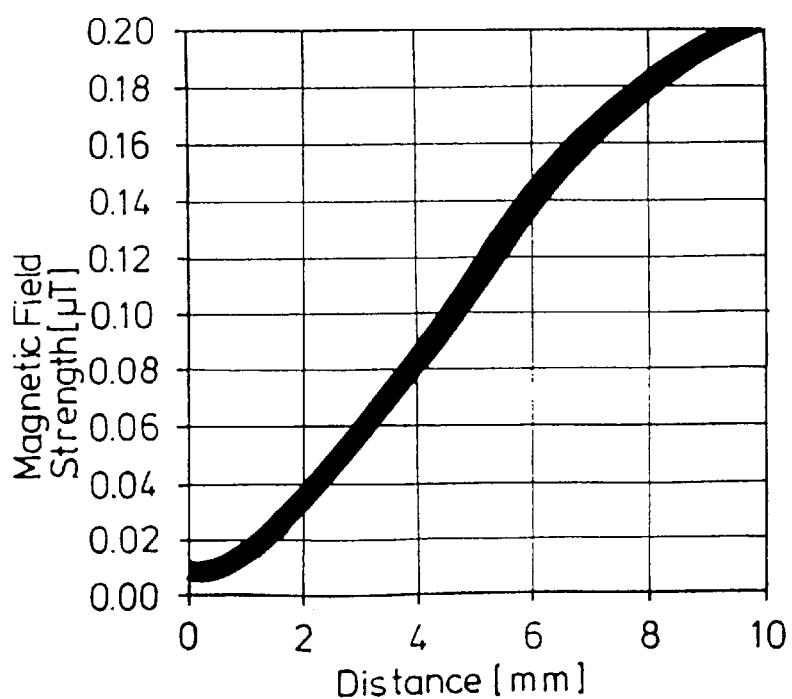
FIG. 2 shows the general relationship between the magnetic B field surrounding a pot on an induction heating cooker in dependence of the thickness of the top layer.

The basis for the invention resides in an observation that the practical efficiency (determined as output power versus input electrical power) of an induction heating cooker 1 is dependent on the distance between the top of the coil structure 2 including the core parts and has a maximum, the sharpness of which is dependent on the actual construction but with the general feature that thicknesses in the range 0.05 to 3 mm cause a higher efficiency than thicknesses outside this range. A general curve displaying this relationship is shown on FIG. 1. Similarly it has been observed as shown on FIG. 2 that the induction field B surrounding a pot 3 on an induction heating coil structure increases with distance at relatively small distances. Hence there may surprisingly be found is a distance which is a suitable compromise between the highest efficiency, the lowest magnetic stray field, and the desired surface material.

Figure 3:
FIG. 3 shows structures for top surfaces according to the invention.
Figure 3:
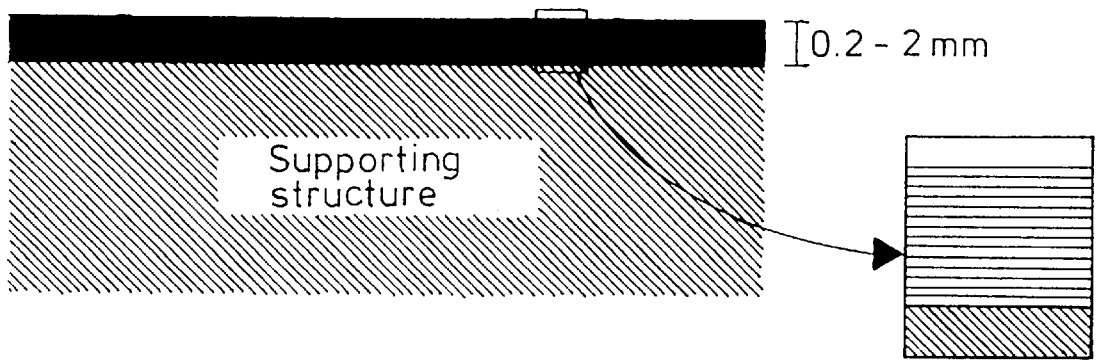
Figure 3:
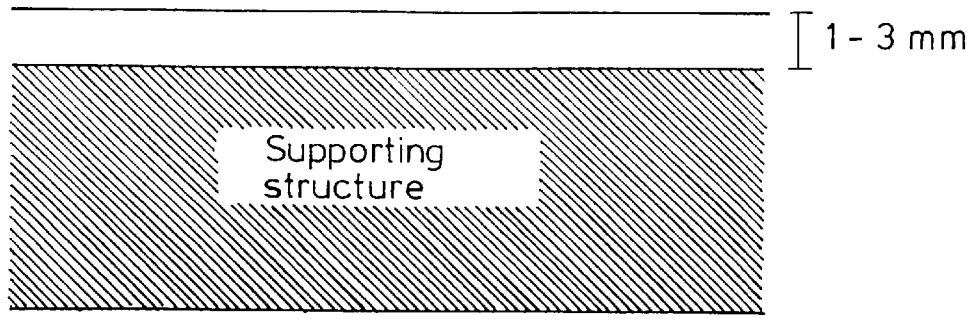

In FIG. 3 is shown embodiments of the invention corresponding to the relevant thickness ranges. It is advantageous to let the surface layer, or top layer 4, extend outside the position of the induction coil structures, and hence the embodiments are generally shown to be supported by the "supporting structure" 5.

Figure 4:
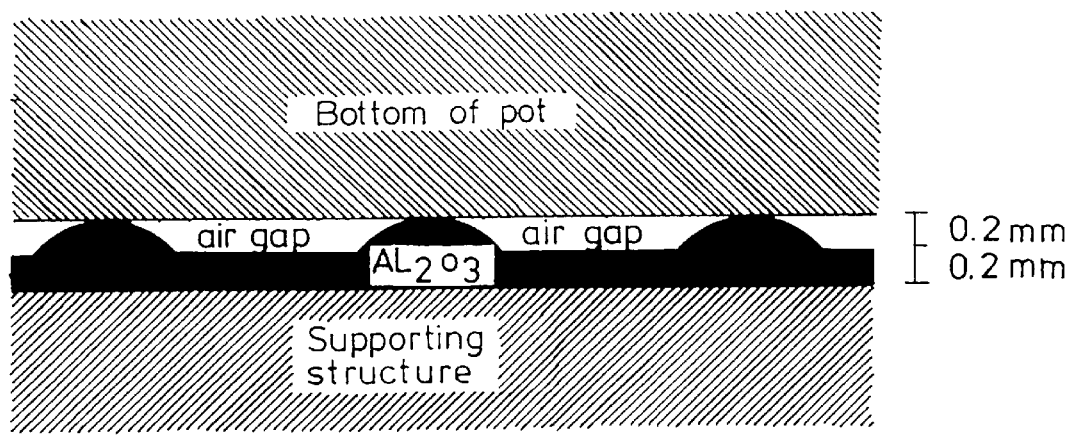
FIG. 4 shows a structure in which an air space supplies heat insulation between the bottom of a pot and the induction heating coil structure.
Figure 1:
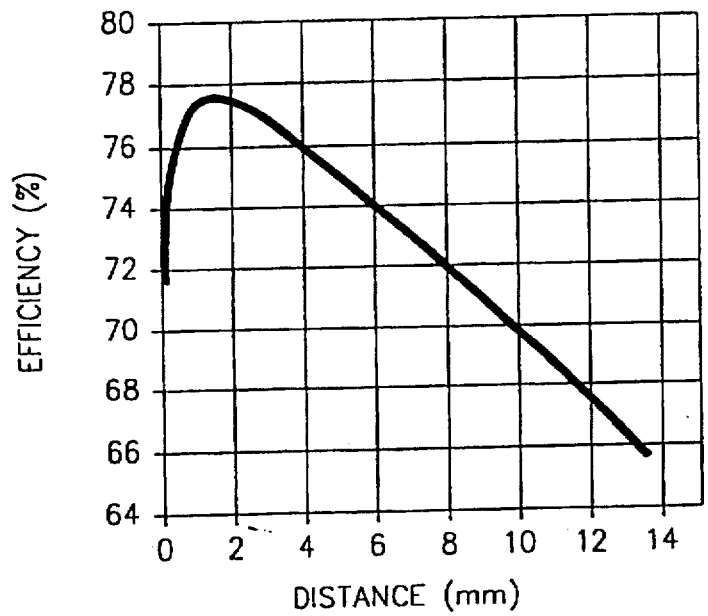
Figure 2:
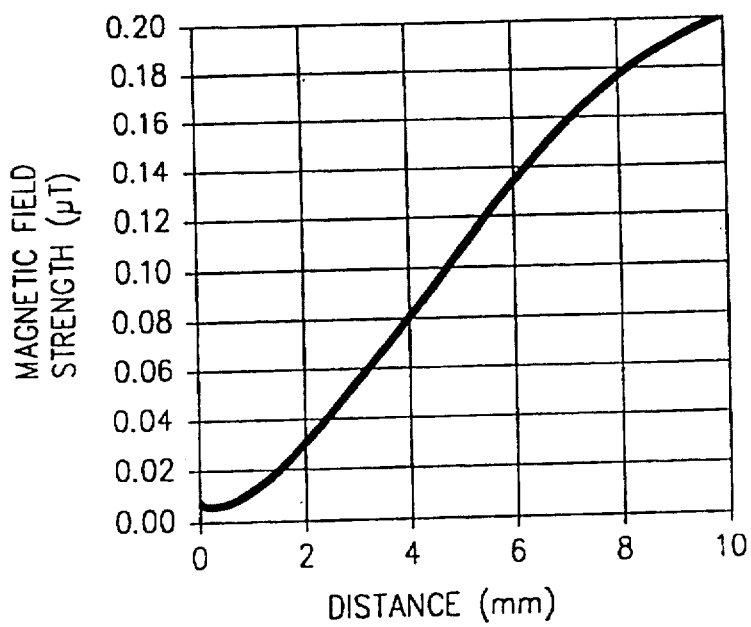
Figure 3:
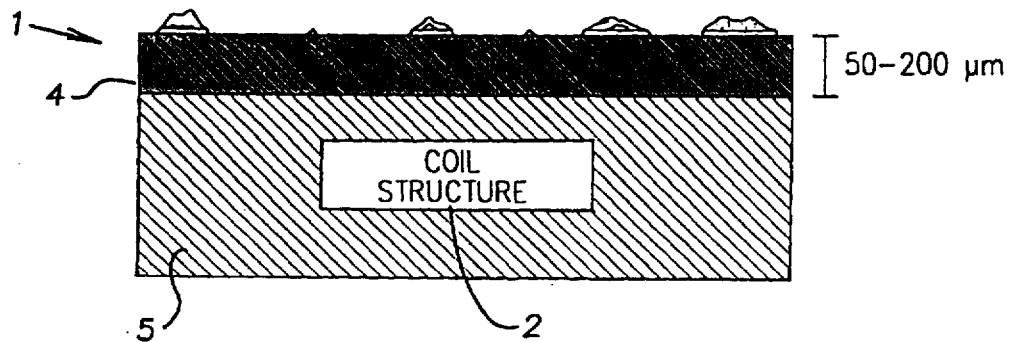
Figure 3:
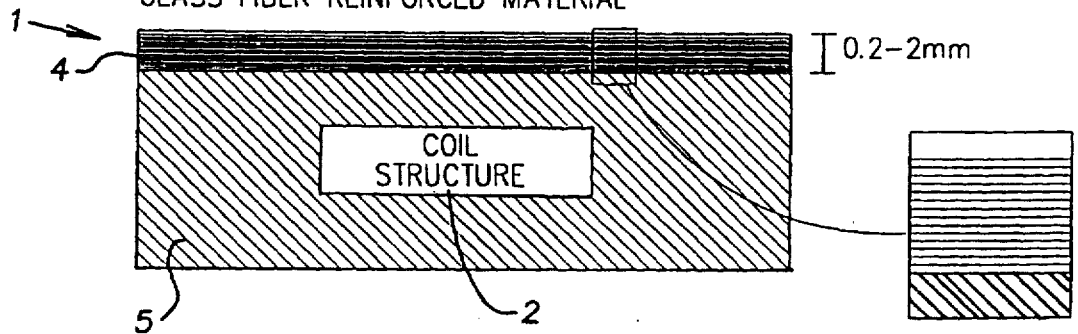
Figure 3:
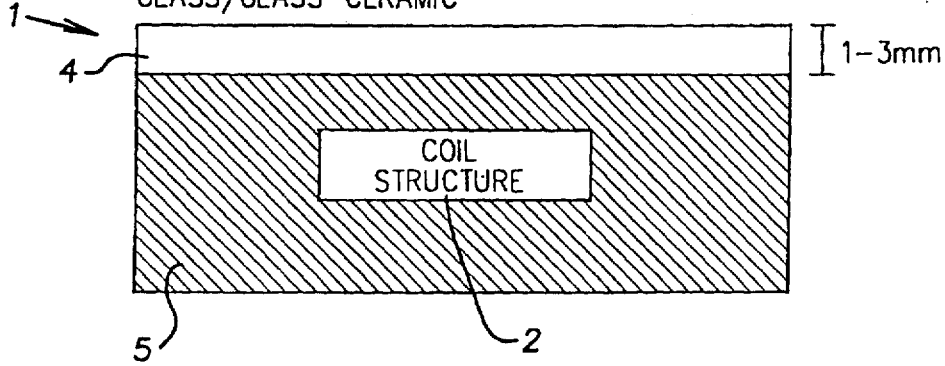
Figure 4:
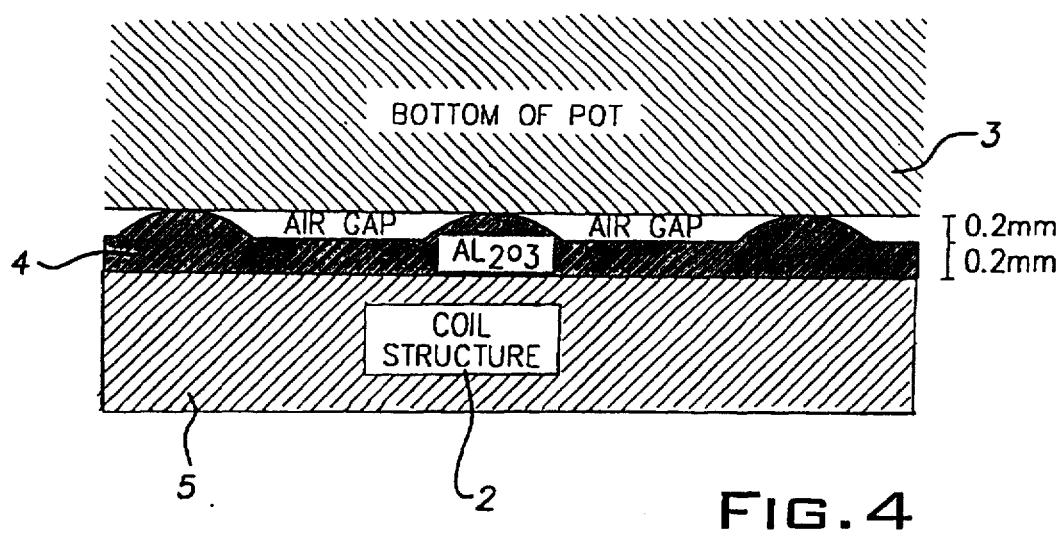
Figure 1:
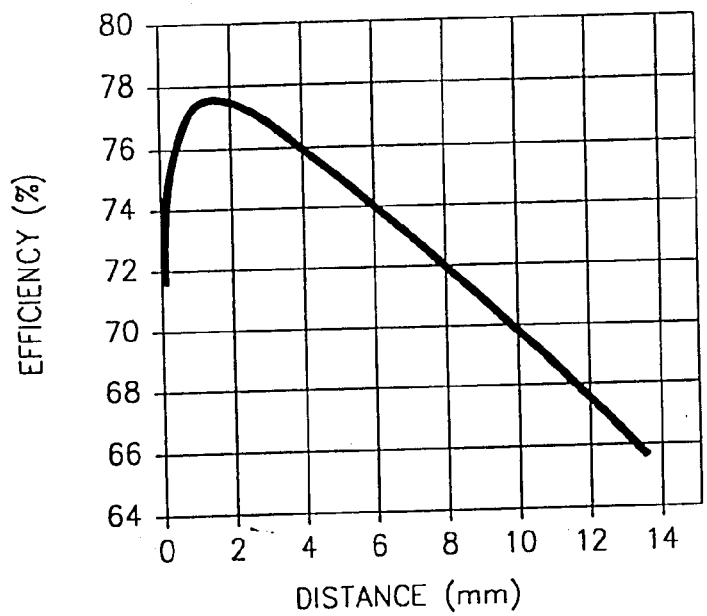
Figure 2:
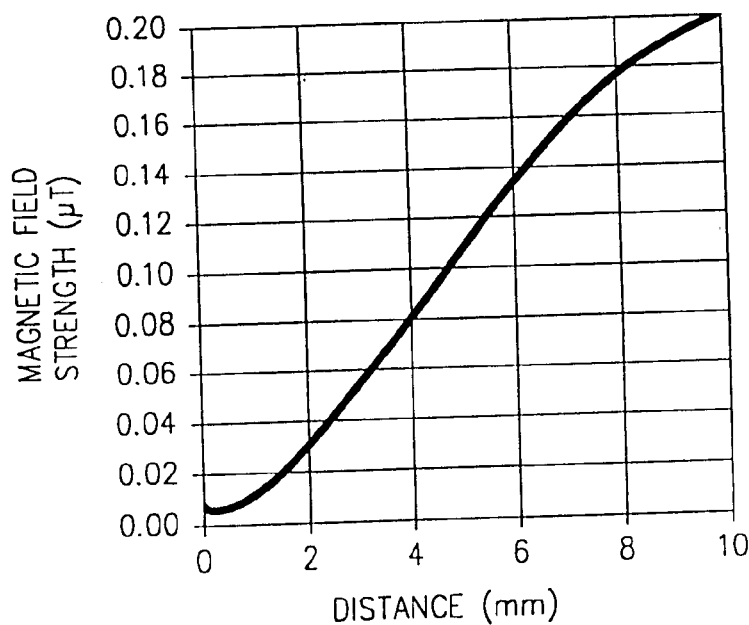
Figure 3:
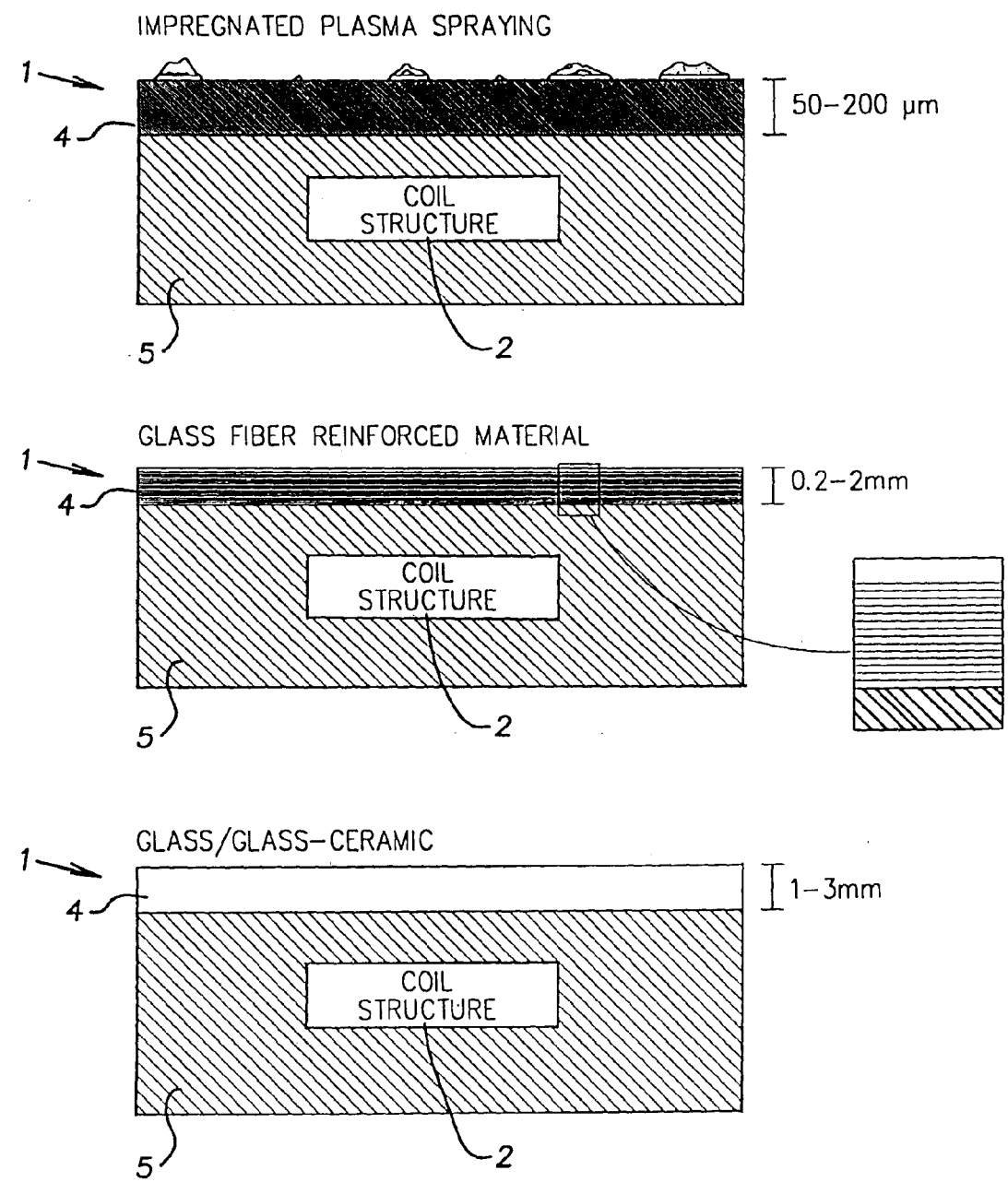
Figure 4:
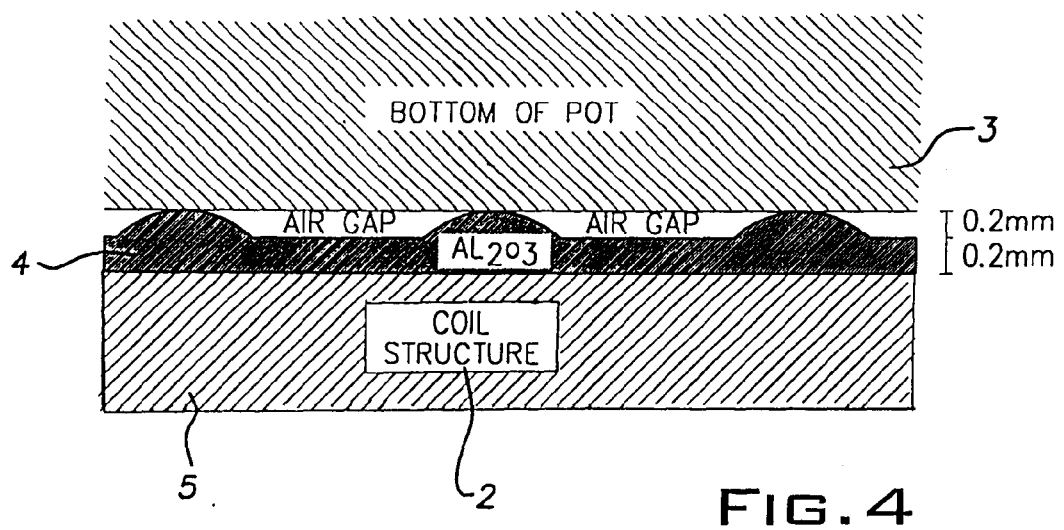

In FIG. 4 is shown an embodiment which displays high strength and cleanability combined with the creation of an air gap which would normally only be obtained in an extremely porous structure. The supporting structure carries an upper surface made of alumina or similar composition which displays rounded projections, the number and distribution of which is dependent on the desired appearance of the top. The area of the individual projections may be selected according to e.g. the types of pot and may be ribs, possibly in a radial distribution.

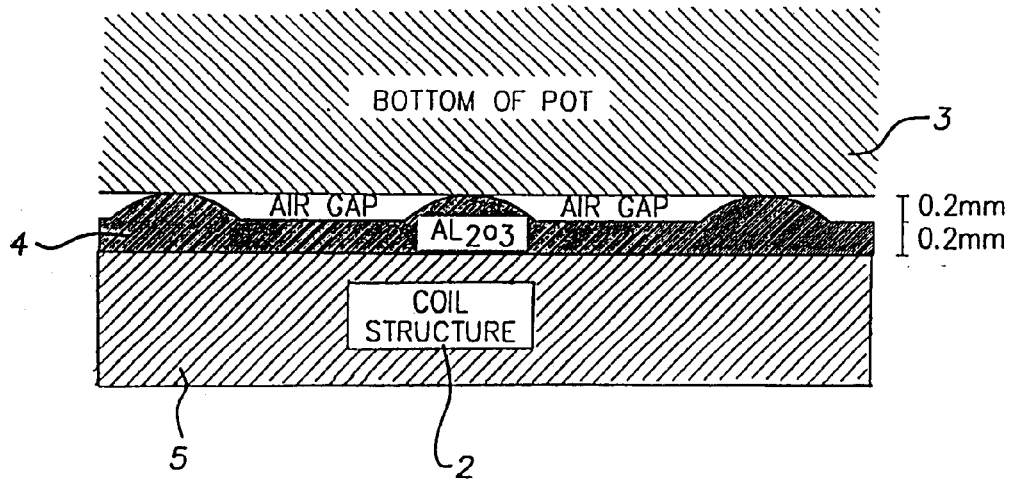

We claim:

1. A cooking surface for an induction heating cooker used to heat a cooking vessel, said cooking surface comprising:

a support structure layer having a supporting surface, the support structure layer containing a coil structure, the coil structure having a top surface located below the supporting surface, a non metallic and non self-supporting top layer having an upper surface defining a support plane for the cooking vessel, the top layer disposed on the supporting surface at least in an area above the coil structure, the supporting surface providing subjacent support for the top layer and the cooking vessel in at least the area above the coil structure, wherein a distance between said support plane and said top surface of said coil structure is between 0.05 mm and 3 mm.

2. A cooking surface according to claim 1, wherein there are a plurality of said coil structures to form a plurality of cooking zones and said top layer extends unbroken over each of the coil structures.

3. A cooking surface according to claim 1, wherein said top layer has an area smaller than said support structure, though larger than said top surface of said coil structure.

4. A cooking surface according to claim 2, wherein said distance is in the range of 0.05 to 0.2 mm and the top layer consists of plasma sprayed hard ceramic.

5. A cooking surface according to claim 2 or 3, wherein said distance is in the range of 0.2 to 2 mm and the top layer consists of a glass fibre reinforced material.

6. A cooking surface according to claim 2 or 3, wherein said distance is in the range of 1.00 to 3.00 mm and the top layer consists of a material selected from a vitroceramic material and a glass material.

7. A cooking surface according to claim 1, wherein said top layer consists of an organically modified ceramic material.

8. A cooking surface according to claim 1, wherein said top layer incorporates reversible heat-modifiable pigments.

9. A cooking surface according to claim 1 or 2, wherein the supporting surface of said support structure forms a shallow well above said coil structure and said top layer is located within said well and is removable from said well.

10. A cooking surface according to any one of claims 1–3, wherein said support structure is a polymer structure, said coil structure is embedded in said polymer structure, said polymer structure has a compartmentalized underside and a plane topside forming a shallow well above said coil structure, and said top layer is located within said well and is removable from said well.

11. A cooking surface according to any one of claims 1–3, wherein said support structure is a self-supporting light alloy structure and said coil structure is fitted into said self-supporting light alloy structure, said light alloy structure has a plane topside forming a shallow well above said coil structure, and said top layer is located within said well and is removable from said well.

12. A cooking surface according to any one of claims 1–3 and 7, wherein said top layer consists of a protective layer and a number of projections directed upwards from said protective layer, a top of the projections defining said support plane.

13. A cooking surface according to claim 1, wherein said distance is in the range of 0.2 and 2.5 mm.

14. A cooking surface according to claim 3, wherein said top layer is removable from said support structure and is flush with surrounding portions of an upper surface of said support structure.

15. A cooking surface according to claim 4, wherein said sprayed hard ceramic is selected from the group of alumina and alumina impregnated with poly-tetra-fluor-ethylene.

16. A cooking surface according to claim 5, wherein said glass fibre reinforced material is selected from the group of material impregnated with poly-tetra-fluor-ethylene and material of a hardened quality.

* * * * *

UNITED STATES PATENT AND TRADEMARK OFFICE
CERTIFICATE OF CORRECTION

PATENT NO. : 6,051,821
DATED : April 18, 2000
INVENTOR(S) : Dahl et al.

Page 1 of 1

It is certified that error appears in the above-identified patent and that said Letters Patent is hereby corrected as shown below:

PTO reference with the Office action of 2/12/99 are not listed. The references are as Follows;

| | | | |
|---|---|---|---|
| 4,939,299 | 7/1983 | McWilliams | 219/458 |
| 4,816,647 | 3/1989 | Payne | 219/464 |
| 2,799,765 | 7/1957 | Jenkins et al | 219/37 |

The wrong drawings were printed. A copy of the correct drawings, filed on June 21, 1999 are attached.

Signed and Sealed this

Eighteenth Day of September, 2001

*Attest:*

Nicholas P. Godici

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,051,821
DATED : April 18, 2000
INVENTOR(S) : Dahl et al.

It is certified that error appears in the above-identified patent and that said Letters Patent is hereby corrected as shown below:

The title page should be deleted and substitute therefore the attached title page.

Delete Drawing Sheets 1-4, and substitute therefore the Drawing Sheets, consisting of Figs. 1-4, as shown on the attached pages.

Signed and Sealed this

Twenty-second Day of January, 2002

*Attest:*

JAMES E. ROGAN
*Director of the United States Patent and Trademark Office*

*Attesting Officer*

United States Patent [19]
Dahl et al.

[11] Patent Number: 6,051,821
[45] Date of Patent: Apr. 18, 2000

[54] COOKING SURFACE WITH OPTIMIZED DISTANCE BETWEEN INDUCTION COIL AND COOKING VESSEL

[75] Inventors: Jan E. Dahl; Thomas F. Pedersen, both of Fredericia, Denmark

[73] Assignee: Aktiebolaget Electrolux, Stockholm, Sweden

[21] Appl. No.: 08/930,923

[22] PCT Filed: Apr. 9, 1996

[86] PCT No.: PCT/DK96/00169

§ 371 Date: Nov. 24, 1997

§ 102(e) Date: Nov. 24, 1997

[87] PCT Pub. No.: WO96/31995

PCT Pub. Date: Oct. 10, 1996

[30] Foreign Application Priority Data

Apr. 7, 1995 [DK] Denmark .................... 0424/95

[51] Int. Cl.$^7$ ........................... H05B 6/12
[52] U.S. Cl. ........................... 219/622; 219/446
[58] Field of Search ........................... 219/621–623

[56] References Cited

U.S. PATENT DOCUMENTS

| | | | |
|---|---|---|---|
| 3,949,183 | 4/1976 | Usami et al. | 219/622 |
| 4,833,288 | 5/1989 | Poumey et al. | 219/622 |

*Primary Examiner*—Teresa Walberg
*Assistant Examiner*—Jeffrey Pwu
*Attorney, Agent, or Firm*—Pearne, Gordon, McCoy & Granger LLP

[57] ABSTRACT

A cooking surface has a thickness between 0.05 and 3.0 mm to optimize between highest efficiency, lowest magnetic stray field, and desired surface material. In the thickness range of 0.05 to 0.2 mm, a top layer may consist of plasma sprayed hard ceramic such as alumina which can be impregnated with poly-tetra-fluor-ethylene. In the thickness range of 0.2 to 2.0 mm, the top layer may consist of glass fibre reinforced material which can be impregnated with poly-tetra-fluor-ethylene and can be of a hardened quality. In the thickness range of 1.00 to 3.00 mm, the top layer may consist of a vitroceramic or glass material.

16 Claims, 3 Drawing Sheets

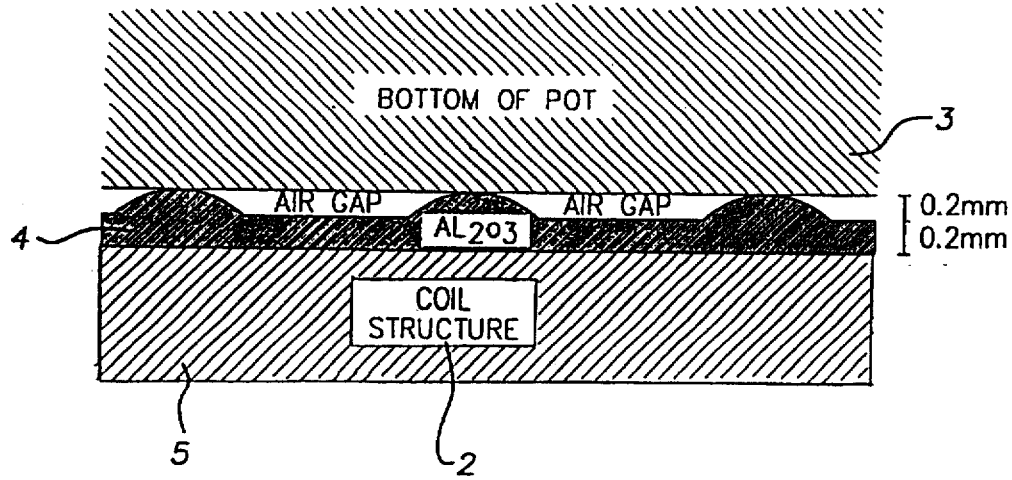

UNITED STATES PATENT AND TRADEMARK OFFICE
CERTIFICATE OF CORRECTION

PATENT NO. : 6,051,821
DATED : April 18, 2000
INVENTOR(S) : Dahl et al.

It is certified that error appears in the above-identified patent and that said Letters Patent is hereby corrected as shown below:

The title page should be deleted and substitute therefore the attached title page.

Delete Drawing Sheets 1-4, and substitute therefore the Drawing Sheets, consisting of Figs. 1-4, as shown on the attached pages.

Signed and Sealed this

Twentieth Day of August, 2002

Attest:

Attesting Officer

JAMES E. ROGAN
*Director of the United States Patent and Trademark Office*

United States Patent [19]
Dahl et al.

[11] Patent Number: 6,051,821
[45] Date of Patent: Apr. 18, 2000

[54] COOKING SURFACE WITH OPTIMIZED DISTANCE BETWEEN INDUCTION COIL AND COOKING VESSEL

[75] Inventors: Jan E. Dahl; Thomas F. Pedersen, both of Fredericia, Denmark

[73] Assignee: Aktiebolaget Electrolux, Stockholm, Sweden

[21] Appl. No.: 08/930,923

[22] PCT Filed: Apr. 9, 1996

[86] PCT No.: PCT/DK96/00169

§ 371 Date: Nov. 24, 1997

§ 102(e) Date: Nov. 24, 1997

[87] PCT Pub. No.: WO96/31995

PCT Pub. Date: Oct. 10, 1996

[30] Foreign Application Priority Data

Apr. 7, 1995 [DK] Denmark ................................ 0424/95

[51] Int. Cl.⁷ ........................................................ H05B 6/12
[52] U.S. Cl. ............................................ 219/622; 219/446
[58] Field of Search .................................... 219/621–623

[56] References Cited

U.S. PATENT DOCUMENTS 3,949,183 4/1976 Usami et al. .............................. 219/622
4,833,288 5/1989 Poumey et al. .......................... 219/622

Primary Examiner—Teresa Walberg
Assistant Examiner—Jeffrey Pwu
Attorney, Agent, or Firm—Pearne, Gordon, McCoy & Granger LLP

[57] ABSTRACT

A cooking surface has a thickness between 0.05 and 3.0 mm to optimize between highest efficiency, lowest magnetic stray field, and desired surface material. In the thickness range of 0.05 to 0.2 mm, a top layer may consist of plasma sprayed hard ceramic such as alumina which can be impregnated with poly-tetra-fluor-ethylene. In the thickness range of 0.2 to 2.0 mm, the top layer may consist of glass fibre reinforced material which can be impregnated with poly-tetra-fluor-ethylene and can be of a hardened quality. In the thickness range of 1.00 to 3.00 mm, the top layer may consist of a vitroceramic or glass material.

16 Claims, 3 Drawing Sheets